United States Patent [19]

Helber

[11] Patent Number: 4,674,782

[45] Date of Patent: Jun. 23, 1987

[54] STORAGE BUMPER

[76] Inventor: Robert A. Helber, 1115 N. Ash Dr., Layton, Utah 84041

[21] Appl. No.: 800,451

[22] Filed: Nov. 21, 1985

[51] Int. Cl.⁴ .......................... B60R 19/02; B60R 9/06
[52] U.S. Cl. .................................... 293/106; 293/117; 296/37.6; 224/42.03 A; 220/335
[58] Field of Search ...................... 293/106, 116, 117; 296/37.6; 224/42.03 R, 42.03 A, 42.04, 42.05; 220/335

[56] References Cited

U.S. PATENT DOCUMENTS

| | | | |
|---|---|---|---|
| 1,213,157 | 1/1917 | Conway | 220/335 |
| 1,611,494 | 12/1926 | Strauss | 220/335 |
| 2,978,153 | 4/1961 | Brindle | 296/37.6 X |
| 3,137,516 | 6/1964 | Cline | 293/117 X |
| 3,471,070 | 10/1969 | Olson | 293/106 X |
| 3,606,385 | 9/1971 | Johannes | 293/106 X |
| 3,614,136 | 10/1971 | Dent | 293/106 X |
| 4,345,697 | 8/1982 | Wilson et al. | 220/335 |
| 4,570,986 | 2/1986 | Sams | 293/117 |

Primary Examiner—Robert B. Reeves
Assistant Examiner—Dennis H. Pedder
Attorney, Agent, or Firm—Christensen, O'Connor, Johnson & Kindness

[57] ABSTRACT

A storage bumper 10 having a compartment assembly 16 with a lid 12 pivotally mounted thereto. Compartment assembly 16 is constructed with upright walls 24 connected to or formed with bottom wall 42 and mounted to base plate 18. Lid 12 is constructed with a seal 26 and reinforcing flanges 20 attached to the underside. Additionally, lid 12 is formed with wings 38 on each longitudinal end to limit opening and catches 30 and 32 for engagement within releasable latches 34 and 36 mounted on wall 24. Recessed wall 44 is set back to allow attachment of accessories to base plate 18 and the mounting of a vehicle license plate. Elongate holes 50 are formed in base plate 18 and adaptor plate 54 providing adjustable mounting of storage bumper 10 to a variety of vehicle frame configurations. Loads applied to the accessories, such as a trailer hitch, are transmitted to the vehicle frame by the base plate 18, allowing the compartment assembly 16 to be formed without reinforcing ribs so that the entire compartment length may be used for storage.

8 Claims, 2 Drawing Figures

U.S. Patent  Jun. 23, 1987  4,674,782

STORAGE BUMPER

TECHNICAL FIELD

This invention relates to storage bumpers and, more particularly, to storage bumpers for vehicles such as utility trucks, motor homes, and trailers.

BACKGROUND OF THE INVENTION

Bumpers are generally conceived as providing protection to a vehicle and its occupants from damage or injury in case of a collision with another vehicle or object. For this reason, the combined use of a bumper for protection and storage on a conventional vehicle has been thought unfeasible because of probable damage to the stored items in the event of a collision.

Thus, patents for bumpers which had a dual purpose have been limited to applications such as in U.S. Pat. Nos. 4,324,427 and 4,068,876. In the U.S. Pat. No. 4,324,427, Huang et al., a tube of protective cloth was rolled up inside the bumper to act also as a cushion or buffer in a collision. And in the U.S. Pat. No. 4,068,876, Muellner, the counterweight assembly around which the bumper was constructed is limited to use on large construction machines.

Vehicles which use an open bed for transporting materials or carrying tools are susceptible to theft of any items left unattended in the bed. Owners desiring protection of belongings, especially long-handled tools, such as shovels and rakes, are forced to lock them in the cab. Other items such as jacks and chains can be stored in optional boxes attached to the bed; however, this has the disadvantage of dirt, grease, or water damaging anything else stored in the box. Further, such boxes cannot accommodate extra-long tools. In addition, motor homes and trailers provide little, if any, space for storage of these items which also gives protection from theft or the elements.

The present invention overcomes the above-mentioned disadvantages by providing a bumper having a storage compartment integrally constructed the entire width of the bumper. High-strength steel is used to give protection from outside collision. The top surface opens as a lid to give easy access for longer items, and locks securely fasten the lid in the closed position to provide protection from theft. In addition, the bumper material is either painted or chromed to resist corrosion.

SUMMARY OF THE INVENTION

The present invention relates to a storage bumper having a base plate for universal mounting on a variety of vehicles. Attached to the base plate is a compartment assembly which acts as the bumper and the storage compartment. The compartment assembly is formed having a bottom wall and upright walls connected or welded thereto. A lid, pivotally connected to the compartment assembly, has weather stripping attached to the underside to prevent the elements from entering the compartment.

In addition to the traditional features of a bumper, such as license plate mounting and illumination, an appealing appearance, and attachment of a trailer mount, the storage bumper also provides locking latches to secure the lid in the closed position, reinforcing members on the lid to resist compressive deformation and transfer the force of impact to the vehicle frame, and a lid stop to prevent the lid from opening too far and damaging the exterior of the vehicle.

Elongated holes are drilled in the base plate to allow adjustment of the storage bumper to the proper height, depending on the vehicle to which it is attached and the preference of the owner. Additional adaptor plates are constructed to enable attachment of the storage bumper to a variety of vehicle frame dimensions and to allow horizontal adjustment.

The storage bumper is preferably constructed of high-strength metal, preferably hot-rolled steel. To resist corrosion, the storage bumper should be coated, preferably with paint. The bumper can also be chromed to provide a more appealing appearance and enhance the corrosion resistance.

BRIEF DESCRIPTION OF THE DRAWINGS

The details of typical embodiments of the present invention will be described in connection with the accompanying drawings, in which.

DETAILED DESCRIPTION OF THE DRAWINGS

Figure 1:
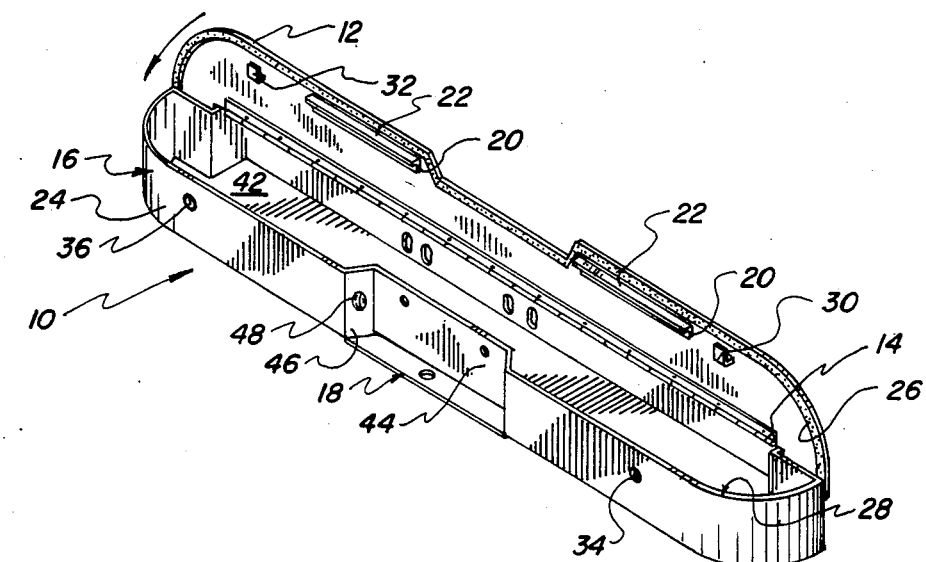
FIG. 1 is an isometric view from an elevated point illustrating a storage bumper of the present invention having the lid in partial open position.

FIG. 1 illustrates storage bumper 10 with lid 12 pivotally attached, preferably by strap hinge 14 to compartment assembly 16. Compartment assembly 16 is attached to base plate 18, preferably by welding and bolting, however attachment may be accomplished by other means without departing from the scope of the present invention.

Lid 12 is constructed with one or more reinforcing members or flanges 20 attached to the underside of lid 12. Flanges 20 are disposed generally normal to lid 12 such that upon closing of lid 12 outer face 22 is adjacent and substantially parallel to the inside surface of a front wall 24. The aligned position of flanges 20 and front wall 24 provides reinforcement against compressive deformation to compartment assembly 16 by transferring the force of an impact to front wall 24 to flanges 20 and then to lid 12, base plate 18, and the vehicle frame.

Additionally lid 12 has weather stripping or seal 26 attached to the underside to follow the contour of the top edge surface 28 of compartment assembly 16. When lid 12 closes on to top edge surface 28, seal 26 forms a tight seal to prevent the elements from entering compartment assembly 16. When lid 12 is closed, catches 30 and 32, attached to the underside of lid 12, engage within releasable locks 34 and 36, respectively, mounted to front wall 24. It is to be understood that other devices may be used to secure lid 12 in the closed position, such as a hasp and ring, or locks may be used in any number, without departing from the scope or spirit of the present invention.

Figure 2:
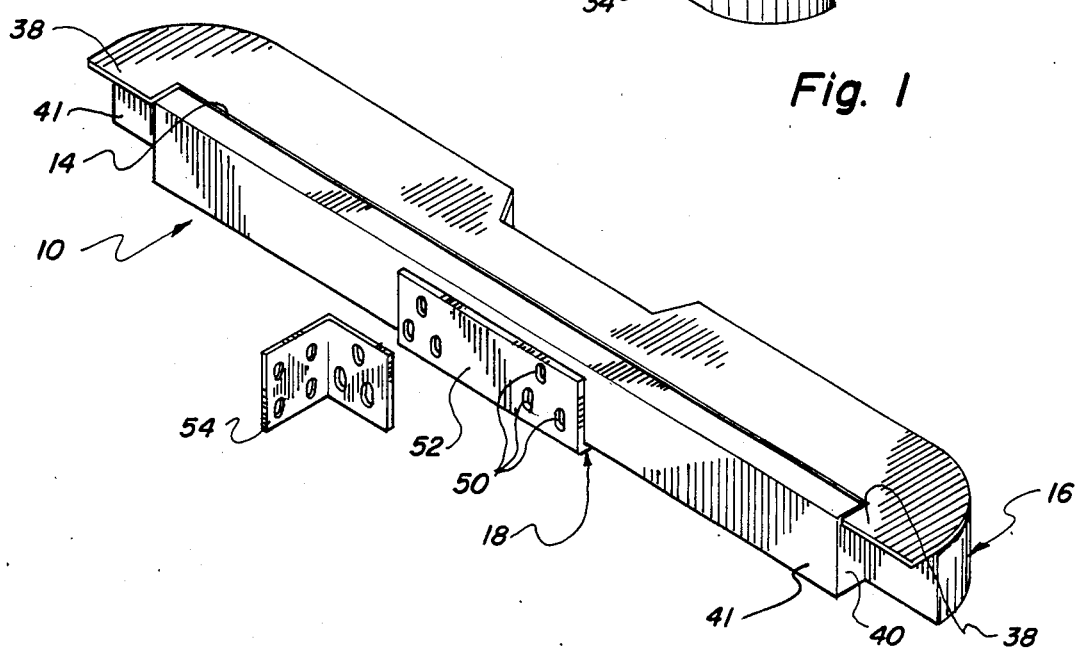
FIG. 2 is an isometric view illustrating the vehicle side of the storage bumper from an elevated position.

In FIG. 2 is shown the rear of storage bumper 10. On the outer ends of lid 12 can be seen wings 38 formed as a part of lid 12. When lid 12 is in the closed position, wings 38 rotate up flush with the top of projection 40 providing a substantially uniform planar top surface. However, when lid 23 is in the full open position, wings 38 contact the outside surface of compartment assembly 16, stopping lid 12 from rotating through a generally upright position and damaging lid 12, the vehicle exterior, or injuring the user.

Compartment assembly 16 is constructed with a bottom surface 42, and front wall 24, projection 40 and rear walls 41 formed or connected to bottom surface 42 either by bending or separate construction and welding. Recessed wall 44 is set back to allow the attachment of accessories such as trailer mounts to base plate 18. Additionally, recessed wall 44 is formed or constructed large enough to accommodate the mounting of a vehicle license plate. On angled wall 46 is shown light fixture 48 which provides illumination to the vehicle license plate at times of darkness. Projection 40 allows the compartment assembly to be partially recessed under the body of the vehicle and project out far enough to present an appealing appearance by eliminating a gap between storage bumper 10 and the vehicle body, and further allows lid 12 to open without interference from the vehicle body.

Storage bumper 10 is preferably constructed of one-eighth inch hot-rolled steel. The material is preferably painted or chromed to provide resistance to corrosion and provide a pleasing appearance. It is to be understood that other high-strength materials may be used or other corrosion resistant coatings may be used without departing from the scope or spirit of the present invention. Base plate 18 has elongated holes 50 drilled or formed on its upright surface 52 to facilitate mounting of storage bumper 10 at the proper height. In addition, adaptor plates 54 are used between base plate 18 and the vehicle frame to enable mounting of storage bumper 10 to a variety of vehicle frame configurations and allow horizontal adjustment.

What is claimed is:

1. A storage bumper comprising:
    a base plate means having a substantially horizontal surface and a substantially vertical surface, said vertical surface adapted to be attached to a vehicle frame, said horizontal surface supporting a compartment assembly and adapted for receiving a trailer hitch, whereby towing loads are directly transmitted to the vehicle frame through the base plate means;
    the compartment assembly having an elongated bottom and a plurality of encompassing upright walls to form an open and unobstructed compartment with substantially a total volume, including an entire surface area of the bottom, available for storage of objects having a length up to the length of the elongated bottom;
    a lid pivotally mounted to said compartment assembly;
    stop means for preventing said lid from rotating beyond a substantially upright position; and
    means for resisting compressive deformation to said compartment assembly.

2. The storage bumper of claim 1, wherein said lid further including an underside and longitudinal ends thereon, and further wherein said stop means comprises wings formed on the longitudinal ends of said lid, such that upon rotation of said lid to a substantially upright position said wings contact said compartment assembly to prevent further rotation of said lid.

3. The storage bumper of claim 2, wherein the compartment assembly includes means for mounting a license plate.

4. The storage bumper of claim 3, wherein the license plate mounting means includes a recessed upright wall formed in a front wall of said compartment assembly.

5. The storage bumper of claim 4, wherein said lid includes a seal on the under side of said lid whereby outside elements are prevented from entering said compartment assembly.

6. The storage bumper of claim 5, wherein said compartment assembly further includes one or more releasable latches for lockingly engaging said lid.

7. The storage bumper of claim 6, wherein said means for resisting compressive deformation includes one or more reinforcing members disposed normal to and attached to the underside of said lid.

8. The storage bumper of claim 7, wherein said reinforcing members further comprise flanges disposed vertically and attached to the underside of said lid whereby when said lid is in the closed position said flanges are disposed adjacent to the inside of said front wall of said compartment assembly.

* * * * *